(12) United States Patent
Pekarich et al.

(10) Patent No.: US 6,549,998 B1
(45) Date of Patent: Apr. 15, 2003

(54) ADDRESS GENERATOR FOR INTERLEAVING DATA

(75) Inventors: Steven P. Pekarich, Slatington, PA (US); Xiao-An Wang, Allentown, PA (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/483,574

(22) Filed: Jan. 14, 2000

(51) Int. Cl.⁷ .............................................. G06F 12/02
(52) U.S. Cl. ........................ 711/220; 711/211; 370/320
(58) Field of Search ................................. 711/219, 220, 711/221, 217, 211; 370/320, 335, 342

(56) References Cited

U.S. PATENT DOCUMENTS

| | | | | |
|---|---|---|---|---|
| 5,638,467 A | * | 6/1997 | Chua et al. ................. | 382/298 |
| 6,064,664 A | * | 5/2000 | Kim ........................... | 370/335 |
| 6,304,581 B1 | * | 10/2001 | Chen et al. ................. | 370/479 |
| 6,314,534 B1 | * | 11/2001 | Agrawal et al. ............ | 714/702 |
| 6,334,197 B1 | * | 12/2001 | Eroz et al. .................. | 714/701 |

* cited by examiner

Primary Examiner—Hiep T. Nguyen
(74) Attorney, Agent, or Firm—Steve Mendelsohn; Ian M. Hughes

(57) ABSTRACT

An interleaver generates a valid interleaved data address for each iteration i of the mapping by the interleaver without employing a multiplication operation. The interleaver includes an address generator comprises two counters, bit-reverse and index tables, and an accumulation register array. The interleaver further comprises two adders, two registers storing tentative address values $address_i$ and $address_{i+1}$, and select logic including a comparator, two buffers, and a multiplexer (mux). Two counters are employed to allow the interleaver to generate at least one valid address for each iteration, and a tentative address is generated from each output value of the two counters. Each iteration generates an output interleaved address. A tentative address is generated by using a portion of the counter value as an address to select a corresponding entry from each of the bit-reverse and index tables and the accumulation register array. The selected values from the index table and accumulation register array are combined in an adder. The value selected from the bit-reverse table is appended to the combination of the selected values from the index table and accumulation register array to form the tentative address. The tentative address generated from the first counter value is compared with a threshold value, and, based on the comparison, one of the two tentative addresses is selected as the output interleaved address. Before beginning the next iteration, the accumulated value used in generating the valid output interleaved address is updated to a new accumulated value. If not all output interleaved addresses have been generated, the counters are incremented by the same increment value, the increment value dependent upon the comparison with the threshold value, and the next iteration begins.

22 Claims, 3 Drawing Sheets

FIG. 1, (PRIOR ART)

ADDRESS GENERATOR FOR INTERLEAVING DATA

BACKGROUND OF THE INVENTION

1. Field of the Invention

The present invention relates to processing of a data stream in a communication system, and, more particularly, to interleaving data bits in segments of a data stream.

2. Description of the Related Art

Interleaving is a commonly employed technique for processing a data stream in communication systems. Interleaving generally comprises receiving N+1 data values (where N+1 is the length of the data stream segment and N is an integer greater than one), and rearranging the order of the N+1 values. Interleaving may be employed, for example, to remove non-random sequences of values in a data stream, or may be employed to reduce effects of burst errors inserted into the data as the segment of data passes through a transmission medium. Such rearranging of data values may be considered to be a mapping $f(*)$ as illustrated in FIG. 1. As shown in FIG. 1, an interleaver maps the address indices daddr (0) to daddr (3) of data values d(0)–d(3) in the segment to corresponding interleaved address indices addr (0) to addr (3) in the interleaved segment. A receiver reverses the interleaving of the data values by de-interleaving. The mapping may be of two forms. Either sequential data values are inserted into an interleaved output corresponding to the sequence of interleaved address indices (i.e., reading serial data into interleaved data in a buffer), or the sequence of interleaved address indices are used to access and output data values in corresponding memory addresses (i.e., reading serial data out of a buffer as interleaved data.

For example, FIG. 2 shows a method of generating a sequence of interleaved addresses from a counter for a mapping operation $f(*)$ specified for an interleaver operating in accordance with the CDMA 2000 standard of the prior art for turbo encoding of data segments. In accordance with the CDMA 2000 standard, the frame size ($N_{turbo}$+1) is the length of the segment of the data stream to be interleaved. The mapping operation $f(*)$ maps a linear sequence of data addresses {daddr(0), daddr(1), . . . , daddr($N_{turbo}$)} of the segment into a permuted sequence of interleaved data addresses {addr(0), addr(1), . . . , addr($N_{turbo}$)}.

At step 201, an (n+5)-bit counter is initialized to 0, where n is the smallest integer such than the frame size ($N_{turbo}$+1) is less than or equal to $2^{n+5}$. At step 202, then most significant bits (MSBs) are extracted from the output value of the counter and one is added to the value formed from the n MSBs. At step 203, the n least significant bits (LSBs) are retained from the result obtained in step 202. At step 204, the n-bit output value of a 32-entry look-up table (such as the table defined in the CDMA 2000 standard) is retrieved using the address formed from the 5 LSBs of the counter output of step 202. At step 205, the n-bit output value from the 32-entry look-up table obtained in step 204 is multiplied with the result of step 203, and the n LSBs are retained from the result.

At step 206, a tentative address is formed from the n LSBs obtained in step 205. The tentative address is formed by (a) bit-reversal of the 5 LSBs of the counter output to form the 5 MSBs of the tentative address, and (b) appending the results of step 205 as the n LSBs of the tentative address. At step 207, a test determines if the tentative output address value is less than or equal to $N_{turbo}$. If the tentative address value is less than or equal to $N_{turbo}$, then the address is accepted at step 208 as an interleaved data address of the interleaved segment. If the tentative address value is less than $N_{turbo}$, then the tentative address is discarded at step 209.

At step 210, a test determines if all interleaved data addresses addr(0), addr(1), . . . , addr($N_{turbo}$) have been generated. If so, the mapping operation ends; otherwise, the counter is incremented at step 211, and the mapping operation returns to step 202 to generate the next address.

For an implementation of an interleaver using the mapping operation shown in FIG. 2, a multiplier is employed in step 205, and an extra iteration is required each time the tentative address formed at step 206 is not within the frame size.

SUMMARY OF THE INVENTION

In accordance with exemplary embodiments of the present invention, an interleaver includes a mapping operation that generates interleaved data addresses for a frame of data values without employing multiplication. In addition, embodiments of the present invention may generate valid interleaved data addresses for each iteration of the mapping operation.

An interleaver employing a mapping operating in accordance with the present invention generates an interleaved address for one sequence of data values by generating at least two counter values, each counter value having a predetermined offset from each other counter value. A bit-reversed value, an index value, and an accumulated value are retrieved for each of the counter values, wherein each of the bit-reversed, index, and accumulated values are identified by an address formed from a portion of the corresponding counter value. A tentative address is formed for each counter value from the corresponding bit-reversed, index, and accumulated values, and the one or more tentative addresses are compared with a threshold to generate a select value, the threshold based on the length of the sequence of data values. The interleaved address is then set as one of the tentative addresses based on the select value.

For further exemplary embodiments, a test determines whether an interleaved address is set for each of the sequence of data values, and, if not, each counter is incremented by a substantially equivalent increment value, the increment value determined by the counter value generating the tentative address set as the interleaved address. A new accumulated value is then set for the accumulated value identified by the portion of the corresponding counter value generating the tentative address set as the interleaved address, the new accumulated value representing one or more combinations of the index value identified by the corresponding portion of the counter value. An interleaver may repeat generating interleaved addresses until each of the sequence of data values is assigned to a corresponding interleaved address.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

In accordance with exemplary embodiments of the present invention, the mapping operation of an interleaver generates interleaved data addresses for a frame of data values using at least two counters, at least two adders, and select logic. For each iteration of the mapping, the counters, adders, and select logic generate, retrieve, and combine address information from one or more look-up tables to form a valid interleaved address without a multiplication operation. For exemplary embodiments described below, a 32-entry lookup table and (n+5)-bit counters may be employed (n an integer greater than 1). Such 32-entry lookup table may be similar to that defined in accordance with the CDMA 2000 standard of the prior art for turbo encoding of data segments. For each (n+5)-bit counter of the exemplary embodiments, n is the smallest integer such than the data stream segment ($N_{turbo}+1$) (frame size) is less than or equal to $2^{n+5}$. As would be apparent to one skilled in the art, however, the techniques described herein may be extended for mapping operations using other look-up table sizes, different frame sizes, and different counter lengths.

Figure 1:
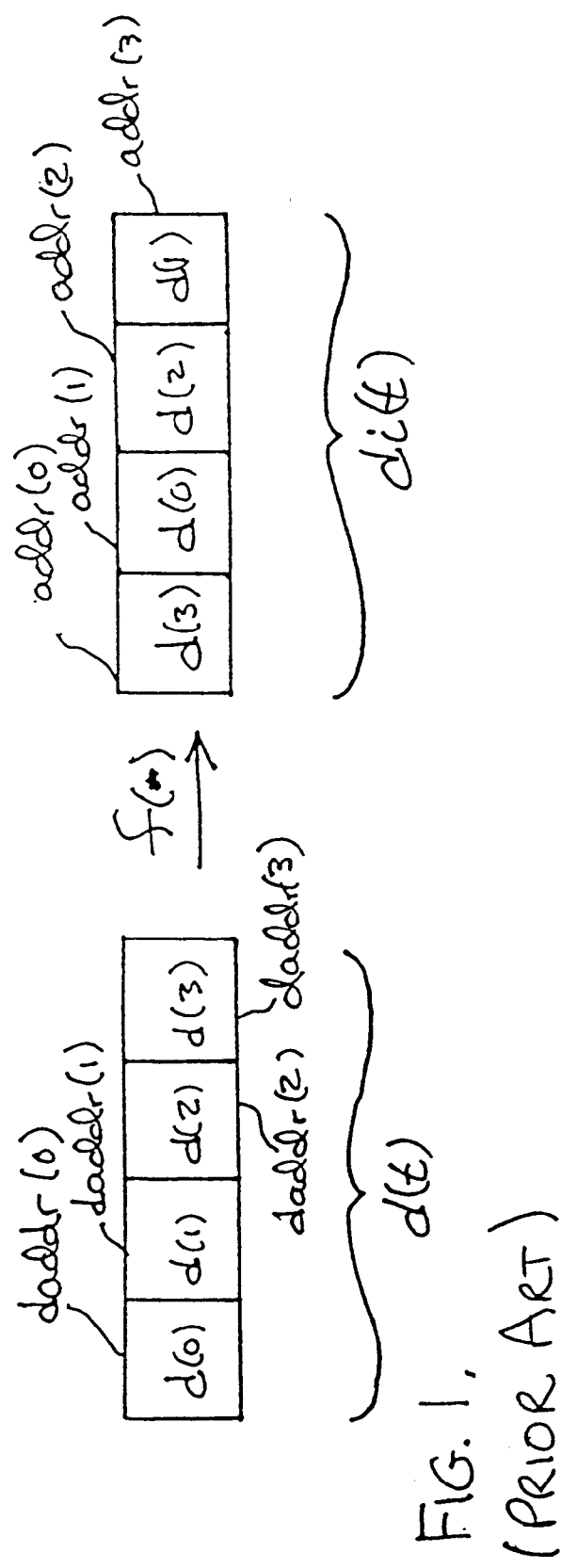
FIG. 1 shows a prior art mapping operation for the interleaving of data values.
Figure 2:
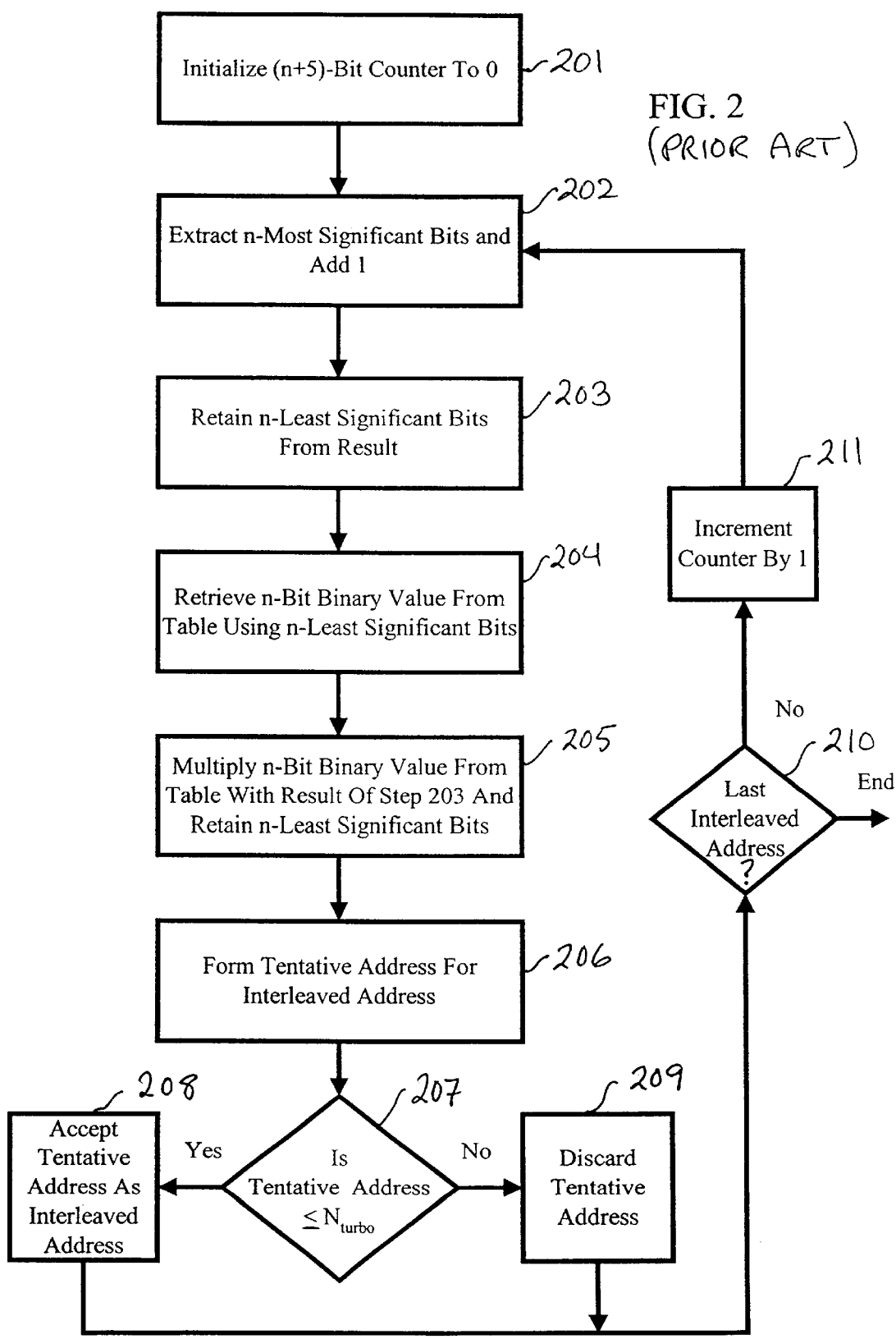
FIG. 2 shows a flow diagram for a prior art mapping operation for an interleaver operating in accordance with turbo encoding of data blocks.
Figure 3:
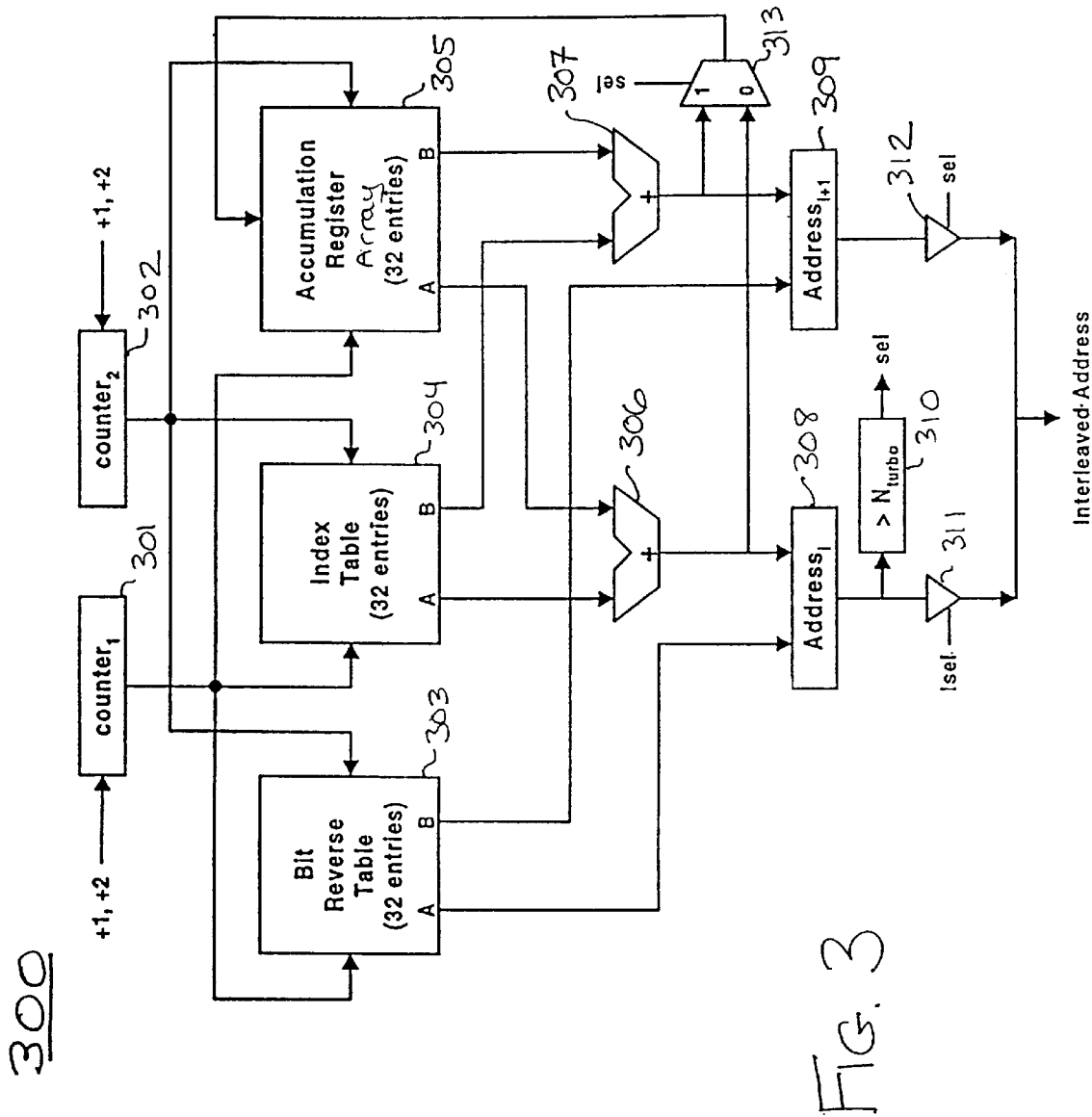
FIG. 3 shows a block diagram of an exemplary implementation of an interleaver employing a mapping operation in accordance with an embodiment of the present invention.

FIG. 3 shows a block diagram of an exemplary implementation of an interleaver 300 employing an iterative mapping operation in accordance with an embodiment of the present invention. The mapping operation of interleaver 300 generates a valid interleaved data address as an output for each iteration without employing a multiplication operation. Interleaver 300 comprises first (n+5)-bit counter 301 (having output value k=counter$_1$) and second (n+5)-bit counter 302 (having output value k=counter$_2$), 32-entry bit reverse table 303 and 32-entry index table 304 implemented in, for example, an addressable memory, and 32-entry accumulation register array 305. Interleaver 300 further comprises adders 306 and 307, registers 308 (storing tentative address address$_i$) and 309 (storing tentative address address$_{i+1}$), and select logic including comparator 310, output buffers 311 and 312, and multiplexer (mux) 313.

The mapping operation in accordance with the exemplary embodiment employs ($N_{turbo}+1$) iterations. In general, the ith iteration value may correspond to the data address value daddr(i) of the input frame. However, as would be apparent to one skilled in the art, other relationships between the input data address and the corresponding interleaved data address of an iteration may be defined.

For the first iteration of the mapping operation (i.e., i=0), first and second counters 301 and 302 are reset to hold values 0 and 1, respectively. Two counters are employed to allow interleaver 300 to generate at least one valid tentative address for each iteration of the mapping operation since counters of the exemplary embodiment do not generate two consecutive invalid tentative addresses. As would be apparent to one skilled in the art, if the implementation of the mapping operation does include counters generating consecutive invalid tentative addresses, additional counters may be added to provide at least one valid address for each iteration of the mapping operation.

A corresponding tentative address is generated for each output of first and second counters 301 and 302. For the ith iteration of the mapping operation, a first tentative interleaved address address$_i$ is generated from the value counter$_1$ of first counter 301, and a second tentative interleaved address address$_{i+1}$ is generated from the value counter$_2$ of second counter 302.

The tentative addresses that are generated may be expressed as the sum of an evenly divided quotient and a remainder. For the exemplary embodiment, the output value k (e.g., counter$_1$ or counter$_2$) of the (n+5)-bit counter may be expressed as k=32l+m, where m is the remainder with m=k mod 32 and l is the greatest number that 32 divides k without remainder In accordance with the exemplary embodiment, the mapping operation generates a sequence of interleaved data addresses from sequentially generated pairs of tentative addresses. For such exemplary embodiment, the tentative address AD(k) generated from an (n+5)-bit counter value k (either counter$_1$ or counter$_2$) may be expressed as given in equation (1):

$$AD(k)=(l \times T(m)) \bmod 2^n \qquad (1)$$

when k=32l+m and m=k mod 32, and where T (m) is the m-th entry of the index table 304 that is a predetermined value based on data rate and frame size. For the exemplary embodiment, m corresponds to the address formed from the values of the least significant bits (LSBs) of the counter value k. Referring to equation (1), the multiplication operation using the integer l may be replaced by l accumulations of the m-th entry T(m), while the modulus (mod $2^n$ operation) may be a remainder of the counter value related to m.

Bit reverse table 303 includes 32 entries that correspond to reverse-ordered bits of the 5 LSBs of the input counter value k. The reverse-ordered LSBs of bit reverse table 303 may be addressed using the corresponding LSBs of counter$_1$ of first counter 301 to provide bit-reversed data at port A of bit reverse table 303; and the corresponding LSBs of counter$_2$ of second counter 302 to provide bit-reversed data at port B of bit reverse table 303.

Similarly, index table 304 includes index values that are predetermined interleaved address information, and, for the exemplary embodiment, index table 304 may include a 32-entry lookup table similar to that defined in accordance with the CMDA 2000 standard of the prior art for turbo encoding of data blocks. Index table 304 may be addressed to provide table entry data using the LSBs of counter of first counter 301 (with corresponding table entry data provided at port A of index table 304). Similarly, index table 304 may also be addressed to provide table entry data T(m) using the LSBs of counter$_2$ of second counter 302 (with corresponding table entry data T(m) provided at port B of index table 304).

Accumulation register array 305 stores 32 accumulated values generated by adders 306 and 307 that are generated as described subsequently. For the exemplary embodiment, the 32 accumulated values stored as entries in accumulation register array 305 are defined as $\{AC_0, AC_1, \ldots, AC_{31}\}$. The accumulated values may be addressed using the LSBs of counter$_1$ of first counter 301 (the corresponding accumulated value provided at port A of accumulation register array 305; and of counter$_2$ of second counter 302 (the corresponding accumulated value provided at port B of accumulation register array 305).

The LSBs of counter$_1$ corresponding to m are used to address m-th entry of bit reverse table 303, index table 304, and accumulation register array 305 that are provided at the respective elements' port A. The LSBs corresponding to m+1 of counter$_2$ are used to address (m+1)-th entry of bit reverse table 303, index table 304, and accumulation register array 305 that are provided at the respective elements' port B. The tentative address address$_i$ for the ith interation is assembled by 1) combining in adder 306 the output value T(m) at port A of index table 304 with the output value $AC_m$ from accumulation register array 305; and then appending in register 308 the bit-reversed entry from bit reverse table 303 to the combination generated by adder 306. The tentative address address$_{i+1}$ is similarly assembled. The tentative address address$_i$ is stored in register 308, and the tentative address address$_{i+1}$ is stored in register 309.

Select signal sel is generated by comparator 310 that compares address$_i$ in register 308 with threshold value $N_{turbo}$. If the value of address$_i$ in buffer 308 is less than or equal to threshold value $N_{turbo}$, select signal sel is set to enable buffer 311 and disable buffer 312 to select the tentative address address$_i$ in register 308 as the interleaved data address. If the value of address$_i$ in buffer 308 is greater than the threshold value $N_{turbo}$, select signal sel is set to disable buffer 311 and enable buffer 312 to select the tentative address address$_{i+1}$ in register 309 as the interleaved data address.

Select signal sel is also used by mux 313 to select either the output of the adder 307 or the output of adder 306 to update the accumulated value $AC_m$ that generated the corresponding valid tentative address selected as the interleaved data address for the iteration, which updated accumulated value is then stored in accumulation register array 305. A new accumulated value for $AC_m$ is set as $AC_m+T(m)$ using the output value from the corresponding adder 306 or 307 when the m-th table entry is active. The table entry is active when the accumulated value $AC_m$ generates a tentative address (either address$_i$ or address$_{i+1}$ depending on whether $AC_m$ is provided from port A or port B of accumulation register array 305) that is a valid interleaved data address.

Both first and second counters 301 and 302 are then incremented by +1 if address$_i$ was selected, or by +2 if address$_{i+1}$ was selected. First and second counters 301 and 302 are incremented by +2 if address$_{i+1}$ is selected because, if both counters were incremented by +1, the next iteration will generate the same interleaved data address from the incremented value for counter$_1$ in first counter 301.

An interleaver employing a mapping operation in accordance with the present invention has the following advantages over prior art interleavers using multipliers. Since a multiplier requires a relatively large amount of area in an integrated circuit (IC), the mapping in accordance with embodiments of the present invention allows for less complex circuit design of the interleaver while reducing the amount of IC area required for an implementation of the circuit. In addition, mapping operations of the prior art may not generate a valid interleaved data address for each iteration of the mapping operation, and so extra processing cycles are required by prior art interleavers to generate all interleaved data addresses. The exemplary embodiments of the present invention allow an interleaver to generate an interleaved data address during each iteration of the mapping operation, allowing for an interleaver that does not add processing delay of extra iterations by the circuit.

While the exemplary embodiments of the present invention have been described with respect to processes of circuits, the present invention is not so limited. As would be apparent to one skilled in the art, various functions of circuit elements may also be implemented in the digital domain as processing steps in a software program. Such software may be employed in, for example, a digital signal processor, micro-controller or general purpose computer.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A method of generating an interleaved address for one of a sequence of data values comprising the steps of:
    (a) generating at least two counter values, each counter value having a predetermined offset from each other counter value;
    (b) retrieving a bit-reversed value, an index value, and an accumulated value for each of the counter values, wherein each of the bit-reversed, index, and accumulated values are identified by an address formed from a portion of the corresponding counter value;
    (c) forming a tentative address for each counter value from the corresponding bit-reversed, index, and accumulated values;
    (d) comparing one or more tentative addresses with a threshold to generate a select value, the threshold based on the length of the sequence of data values; and
    (e) setting the interleaved address as one of the tentative addresses based on the select value.

2. The invention as recited in claim 1, further comprising the steps of
    (f) testing whether an interleaved address is set for each of the sequence of data values, and, if not,
        (1) incrementing each counter by a substantially equivalent increment value, the increment value determined by the counter value generating the tentative address set in step (e) as the interleaved address, and
        (2) setting a new accumulated value for the accumulated value identified by the portion of the corresponding counter value generating the tentative address set in step (e) as the interleaved address, the new accumulated value representing one or more combinations of the index value identified by the corresponding portion of the counter value.

3. The invention as recited in claim 2, further comprising the step of (g) repeating steps (a) through (f) to generate an interleaved address for each of the sequence of data values.

4. The invention as recited in claim 3, wherein, for step (g), each repetition of the steps corresponds to an iteration and the interleaved address set in step (e) of the iteration is assigned to the data value having an address related to the iteration.

5. The invention as recited in claim 2, wherein, for step (a), first and second counter values are generated, the second counter value offset by one from the first counter value; and, for step (f1), each counter value is incremented by one if the tentative address generated for the first counter value is set as the interleaved address, and each counter value is incremented by two if the tentative address generated for the second counter value is set as the interleaved address.

6. The invention as recited in claim 5, wherein, for step (c), each tentative address is formed by combining the corresponding index value with the accumulated value and appending the corresponding bit-reversed value to the combination.

7. The invention as recited in claim 5, wherein, for step (b), the index values are defined in accordance with a code-division, multiple-access (CDMA)-2000 standard of either a wireless or cellular telecommunications network.

8. The invention as recited in claim 1, wherein the method generates an interleaved address for each of the sequence of data values, the sequence of data values forming a data frame, and the method further comprises the step of assigning each data value to the corresponding interleaved address to form an interleaved data frame.

9. The invention as recited in claim 1, wherein the method is implemented as steps of a processor in an integrated circuit.

10. The invention as recited in claim 1, wherein the method is implemented in a transceiver operating in accordance with a code-division, multiple-access (CDMA) standard of either a wireless or cellular telecommunications network.

11. Circuit for generating an interleaved address for one of a sequence of data values comprising:
   a counter generating at least two counter values, each counter value having a predetermined offset from each other counter value and a portion of each counter value provided as a corresponding address signal, wherein, for each of the counter values, one of a plurality of bit-reversed values, one of a plurality of index values, and one of a plurality of accumulated values are identified by the corresponding address signal;
   an adder generating, for each counter value, a combination of the index and accumulated values identified by the corresponding address signal of the counter value, wherein a tentative address is generated for each counter value by appending the bit-reverse value identified by the corresponding address signal to the combination provided by the adder for the corresponding counter value; and
   a comparator providing a select signal based on a comparison of one or more tentative addresses with a threshold, the threshold based on the length of the sequence of data values; wherein the interleaved address is set as one of the tentative addresses based on the select signal.

12. The invention as recited in claim 11, further comprising:
   a logic circuit for determining whether an interleaved address is set for each of the sequence of data values, and, if not, the logic circuit providing a signal to increment each counter value by a substantially equivalent increment value, the increment value determined by the counter value generating the tentative address set as the interleaved address, and
   a multiplexer selecting, based on the select signal, as a new accumulated value the combination of the index and accumulated values identified by the address signal of the corresponding counter value and corresponding to the tentative address set as the interleaved address,
   wherein the accumulated value of the memory identified by the address signal of the corresponding counter value and corresponding to the tentative address set as the interleaved address is set as the new accumulated value selected by the multiplexer.

13. The invention as recited in claim 12, wherein an interleaved address is generated for each of the sequence of data values.

14. The invention as recited in claim 12, wherein first and second counter values are generated, the second counter value offset by one from the first counter value; and each counter value is incremented by one if the tentative address generated for the first counter value is set as the interleaved address, and each counter value is incremented by two if the tentative address generated for the second counter value is set as the interleaved address.

15. The invention as recited in claim 14, wherein each tentative address is formed by combining the corresponding index value with the accumulated value and appending the corresponding bit-reversed value to the combination.

16. The invention as recited in claim 14, wherein the index values are defined in accordance with a code-division, multiple-access (CDMA)-2000 standard of either a wireless or cellular telecommunications network.

17. The invention as recited in claim 11, wherein the circuit generates an interleaved address for each of the sequence of data values, the sequence of data values forming a data frame, and the circuit further assigns each data value to the corresponding interleaved address to form an interleaved data frame.

18. The invention as recited in claim 11, wherein the circuit is implemented in an integrated circuit.

19. The invention as recited in claim 11, wherein the circuit is implemented in a transceiver operating in accordance with a code-division, multiple-access (CDMA) standard of either a wireless or cellular telecommunications network.

20. A computer-readable medium having stored thereon a plurality of instructions, the plurality of instructions including instructions which, when executed by a processor, cause the processor to implement a method of generating an interleaved address for one of a sequence of data values, the method comprising the steps of:
   (a) generating at least two counter values, each counter value having a predetermined offset from each other counter value;
   (b) retrieving a bit-reversed value, an index value, and an accumulated value for each of the counter values, wherein each of the bit-reversed, index, and accumulated values are identified by an address formed from a portion of the corresponding counter value;
   (c) forming a tentative address for each counter value from the corresponding bit-reversed, index, and accumulated values;
   (d) comparing one or more tentative addresses with a threshold to generate a select value, the threshold based on the length of the sequence of data values; and
   (e) setting the interleaved address as one of the tentative addresses based on the select value.

21. The invention as recited in claim 20, further comprising the steps of
   (f) testing whether an interleaved address is set for each of the sequence of data values, and, if not,
      (1) incrementing each counter by a substantially equivalent increment value, the increment value determined by the counter value generating the tentative address set in step (e) as the interleaved address, and
      (2) setting a new accumulated value for the accumulated value identified by the portion of the corresponding counter value generating the tentative address set in step (e) as the interleaved address, the new accumulated value representing one or more combinations of the index value identified by the corresponding portion of the counter value.

22. The invention as recited in claim 21, further comprising the step of (g) repeating steps (a) through (f) to generate an interleaved address for each of the sequence of data values.

* * * * *